United States Patent [19]

Czirr

[11] Patent Number: 5,734,166
[45] Date of Patent: Mar. 31, 1998

[54] LOW-ENERGY NEUTRON DETECTOR BASED UPON LITHIUM LANTHANIDE BORATE SCINTILLATORS

[75] Inventor: John B. Czirr, Mapleton, Utah

[73] Assignee: Mission Support Incorporated, Salt Lake City, Utah

[21] Appl. No.: 706,141

[22] Filed: Sep. 20, 1996

[51] Int. Cl.⁶ .................................................. G01T 3/06
[52] U.S. Cl. .............................. 250/390.11; 252/301.4 R
[58] Field of Search ........................ 250/390.11, 370.05, 250/370.12, 483.1; 252/301.4 R

[56] References Cited

FOREIGN PATENT DOCUMENTS 8706601  11/1987  WIPO .............................. 252/301.4 R

OTHER PUBLICATIONS

Abdullaev et al., "Crystal structure of the double lithium ytterbium orthoborate $Li_6Yb(BO_3)_3$", Sov. Phys. Crystallogr., vol. 22, No. 2, pp. 220–222, Mar.–Apr. 1977.

Abdullaev et al., "Synthesis and Structural Study of Crystals of the Double Orthoborate of Lithium and Holmium", Russian Journal of Inorganic Chemistry, 22, (12), 1977.

Mascetti et al., "Concentration Quenching of the $ND^{3+}$ Emission in Alkali Rare Earth Borates", Journal of Solid State Chemistry 50, pp. 204–212, 1983.

Garapon et al., "Energy Transfer in $Li_6GD(BO_3)_3$", Journal of Luminescence 34, pp. 211–222, 1985.

Kiliaan et al., "A study of the Sensitizer in the Luminescent Systems $(Y,Gd)_2O_2SO_4$:Bi,Tb and $Li_6(Y,Gd)(Bo_3)_3$:S,Tb $(S-C^{3+}, Pr^{3+}$ or $Bi^{3+})$", Materials Chemistry and Physics, 18, pp. 155–170, 1987.

*Primary Examiner*—David P. Porta
*Assistant Examiner*—Richard Hanig
*Attorney, Agent, or Firm*—Foley & Lardner

[57] ABSTRACT

An apparatus for detecting neutrons includes a cerium activated scintillation crystal containing ¹⁰B, with the scintillation crystal emitting light in response to α particles emitted from the $^{10}B(n,\alpha)Li^*$ reaction. The apparatus also includes a gamma scintillator positioned adjacent the crystal and which generates light in response to gamma rays emitted from the decay of Li*. The apparatus further includes a first and a second light-to-electronic signal converter each positioned to respectively receive light from the crystal and the gamma scintillator, and each respectively outputting first and second electronic signals representative of α particles from the $^{10}B(n,\alpha)Li^*$ reaction and gamma rays from the $^{10}B(n,\alpha)Li^*$ reaction. The apparatus includes a coincidence circuit connected to receive the first and second signals and which generates a coincidence signal when the first and second signals coincide. The apparatus also includes a data analyzer for receiving an additional signal from at least one of the first and second converters, and for operating in response to the coincidence signal.

14 Claims, 4 Drawing Sheets

LOW-ENERGY NEUTRON DETECTOR BASED UPON LITHIUM LANTHANIDE BORATE SCINTILLATORS

BACKGROUND OF THE INVENTION

1. Field of the Invention

The invention is directed toward a low energy neutron detector. More particularly, the invention is directed to an improved neutron detector which uses an activated lithium lanthanide borate, such as lithium gadolinium borate, as a scintillation material.

2. Description of the Prior Art

Lithium glass scintillators are an effective means for detecting low-energy neutrons and find wide application in neutron scattering research. However, lithium glass scintillators suffer from a serious defect when used in neutron scattering facilities engaged in material science research. In these applications, there is typically an intense gamma background (in relation to the neutron flux), and the gamma sensitivity of Li-glass seriously degrades the quality of data obtained. Gamma rays can simulate a neutron capture event in Li-glass and there is no effective technique for separating the gamma signal from the neutron signal (for those gamma ray signals in the vicinity of the capture peak).

An alternative material with a high capture cross section for low energy neutrons is the $^{10}B$ nucleus. However, an efficient $^{10}B$ scintillator has not been available to-date.

Neutron scattering research facilities require a detector system that is efficient, fast, and gamma insensitive. None of the detector systems currently used by researchers meet all these requirements.

SUMMARY OF THE INVENTION

In accordance with the principles of the invention, a new neutron detector has been developed which overcomes the disadvantages of prior art Li-glass detectors. The neutron scintillation detector in accordance with the invention uses a boron-containing crystalline scintillator, useful for low-energy neutron detection. The $^{10}B(n,\alpha)$ reaction possesses a large cross section for neutron capture and provides the advantage of permitting increased insensitivity to background gamma by requiring a coincidence signal between the charged reaction products and the prompt gamma ray, thereby strongly discriminating against gamma background events.

The borate material developed is an efficient scintillator, provides a high boron atomic density, and is conveniently formed into transparent single crystals. There are several variations of this material which may be used to provide a variety of desired nuclear detection characteristics. Selected isotopes of B or Li may be used to optimize the neutron detection efficiency.

The isolated peak represents the full energy peak for the 478 keV gamma ray. (The horizontal scale of FIG. 5 is displaced approximately 100 channels relative to FIG. 4.)

Figure 6:
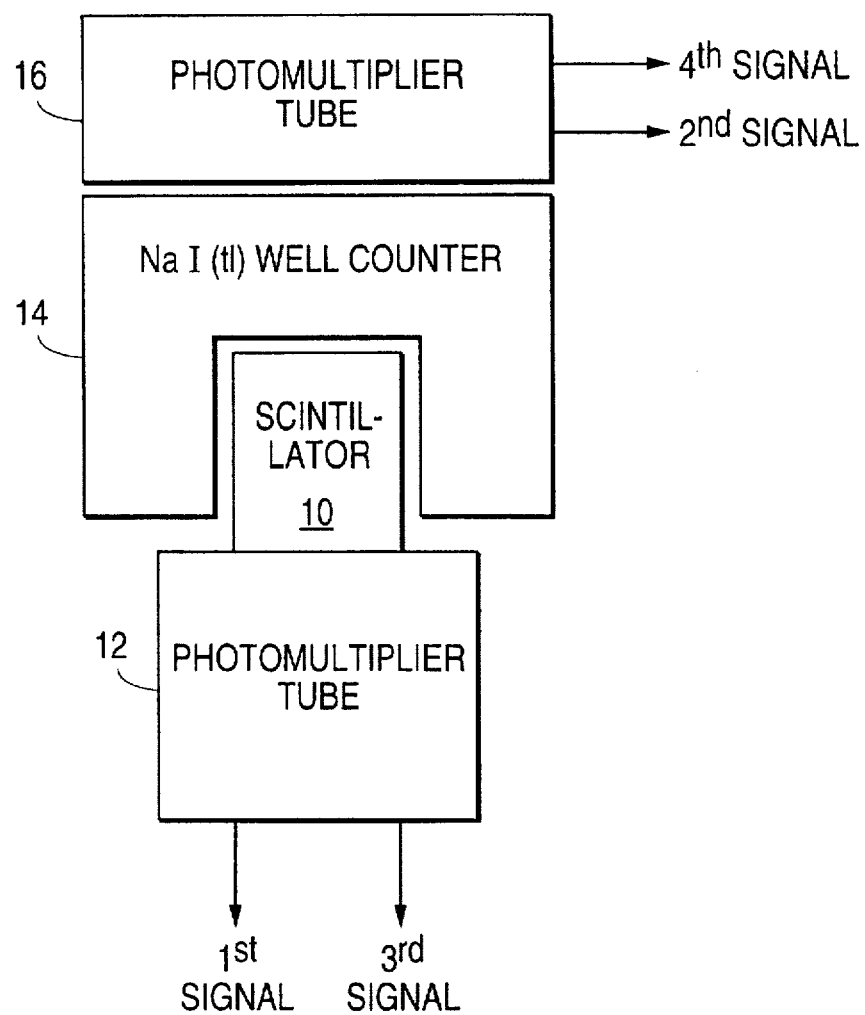

FIG. 6 is a block diagram of a coincidence circuit arrangement for measuring the simultaneous products of the $^{10}B(n,\alpha)^{7}Li^*$ reaction.

Figure 7:
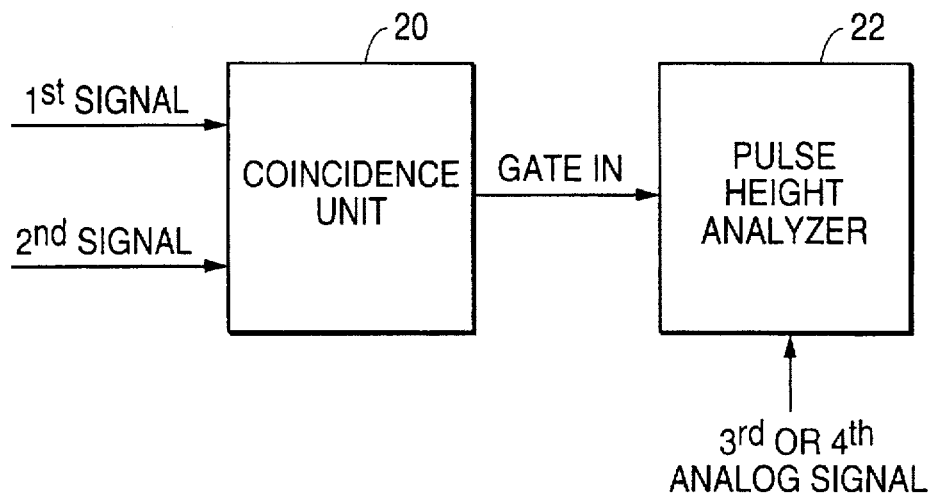

FIG. 7 is a block diagram of the electronics used in the coincidence detection arrangement of FIG. 6.

DETAILED DESCRIPTION OF PREFERRED EMBODIMENTS

Boron has two crucial advantages over $^{6}Li$ for detection of low-energy neutrons in the presence of gamma rays. First, its interaction cross section is four times higher (which permits thinner, less gamma sensitive scintillators); and, secondly, the capture of a neutron in $^{10}B$ produces an energetic gamma ray in addition to charged particles. This dual emission provides a coincident signal that identifies which events are caused by neutrons and can be used to discriminate strongly against the single events produce by ambient gamma background.

Test Procedures

Tests were made with a screening procedure developed by the inventor, Dr. B. Czirr. When $^{6}Li$ and $^{10}B$ capture neutrons, the reaction products include an energetic alpha particle, which is partially responsible for the light emitted by the scintillator. The screening procedure employed an $^{241}Am$ source to provide 5.5 MeV monoenergetic alpha particles to mimic this process. The powder to be tested was spread thinly on a flat-faced photomultiplier tube and irradiated with the alpha source. Powders were used for screening because they are typically less expensive and easier to prepare. During the development of the screening procedure, Dr. Czirr conducted a test with ground strontium fluoride scintillator material which indicated that the signal from the powder was approximately 50% of that from a single crystal. During numerous subsequent tests, it was found that if a powder scintillates, the single crystal form will emit light as well, generally twice as much light.

The potential of these new scintillators for neutron scattering applications was evaluated in relation to a thin single sheet of Bicron GS-20 $^{6}Li$-glass scintillator. Li-glass was used as a scintillation efficiency standard because of its wide acceptance in the neutron scattering community as a viable low-energy neutron detector.

The lithium lanthanide borates (including yttrium compounds) are unusual in that they are essentially one-dimensional as far as energy transfer is concerned. The interchain distance between lanthanide ions is approximately one-half that of the intrachain distance. This implies that the predominant energy transfer will be along a one-dimensional lattice. Trivalent Gd ions are found to play an active role in the energy transfer process in other Gd containing scintillators and most probably to do so in the borates. This enhancement (as compared to yttrium) in energy transfer would explain the observed high scintillation efficiency for the LiGd borates. Small single crystals of this material have been grown by the Czochralski technique with 5% by weight $CeO_2$ in the melt. A single crystal was tested for pulse height response using monoenergetic alphas. The resulting signal size was a surprisingly high 5.6 times the Li-glass standard, approximately equal to the original powder sample.

Figure 1:
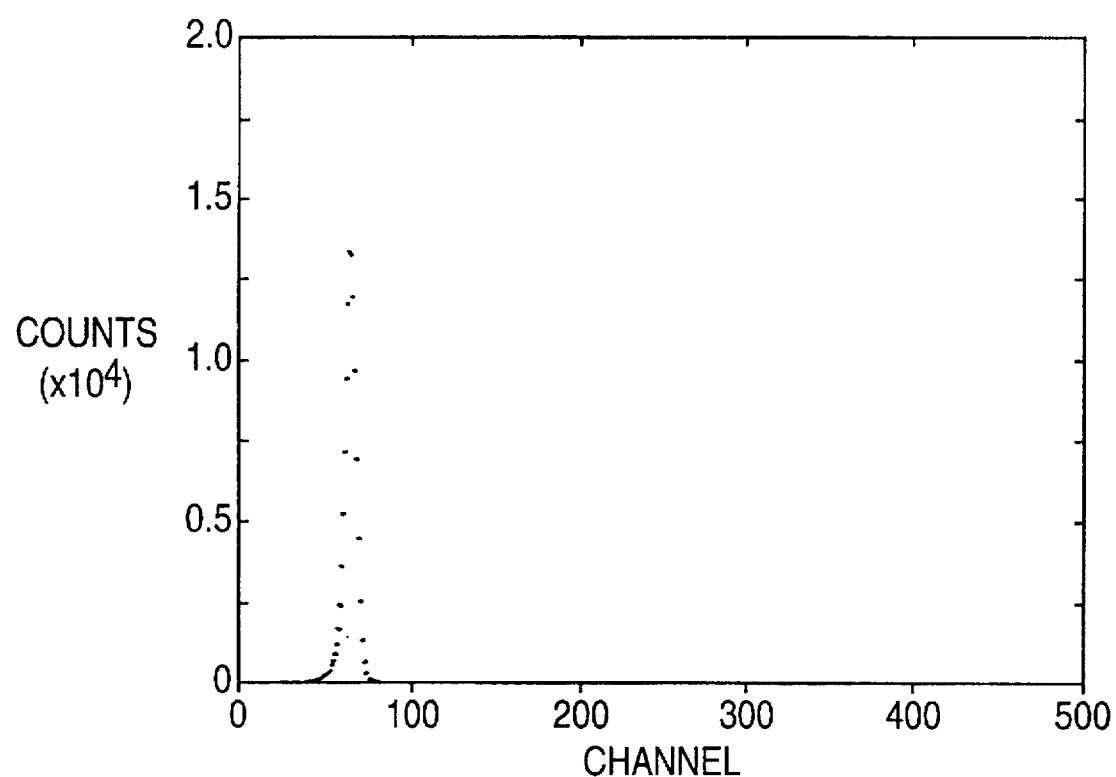
FIG. 1 shows a pulse height spectrum for Li-glass under alpha irradiation.
Figure 2:
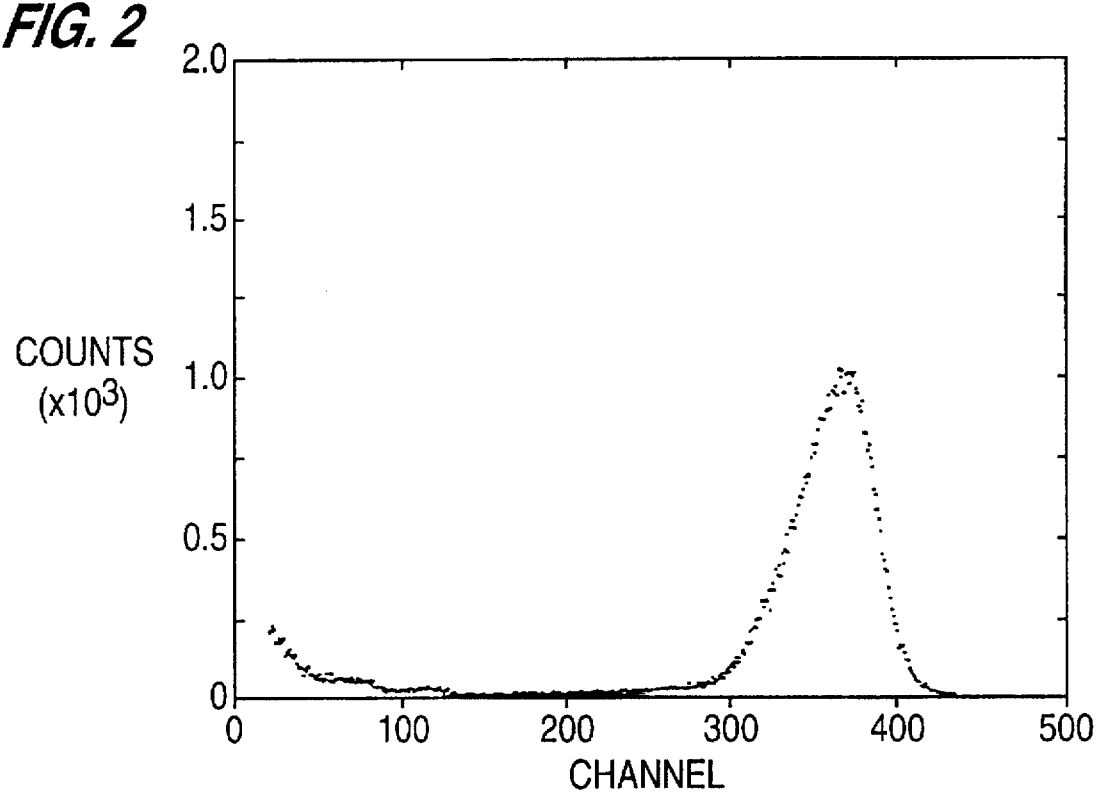
FIG. 2 shows a pulse height spectrum of lithium gadolinium borate under alpha irradiation.

FIG. 1 shows the pulse height spectrum from the Li-glass standard, under alpha irradiation. FIG. 2 shows the pulse height spectrum for the gadolinium compound. These two plots were taken with the same gain conditions.

Figure 3:
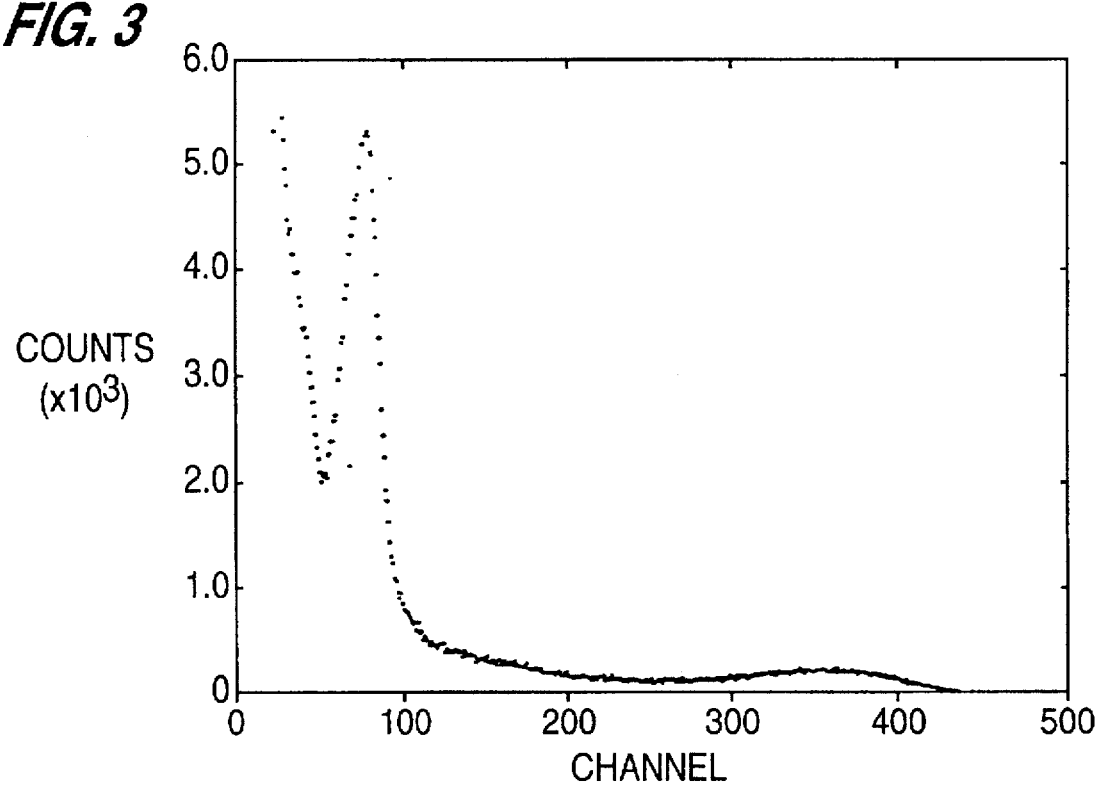
FIG. 3 shows a pulse height spectrum of lithium gadolinium borate under neutron irradiation.

FIG. 3 shows the pulse height response of lithium gadolinium borate under slow neutron irradiation. The graph shows both the $^{10}$B peak (large, narrow peak centered around channel 80) and the $^6$Li peak (small, wide peak centered around channel 380). The large gamma background is also shown below the $^{10}$B peak.

Several scintillators were produced and tested using Li$_6$Y (BO$_3$)$_3$ as the Ce host material. The best results were obtained with a Ce to Y ratio of 0.1, yielding a signal that was 1.3 times the glass standard. A small single crystal was produced with 5% Ce in the melt. The following Table 1 summarizes the test data taken. The strong and unexpected response of the Lithium Lanthanide Borates is shown in the first row of the table.

TABLE 1

MATERIAL CHARACTERISTICS

|  | $^6$Li-Glass | Li$_6$Gd(BO$_3$)$_3$ | Li$_6$Y(BO$_3$)$_3$ |
|---|---|---|---|
| Relative Signal Amplitude ($\alpha$) | 1.0 | 5.6 | 1.3 |
| Atomic Density ($\times 10^{22}$ atoms cm$^{-3}$) | 1.72($^6$LI) | 3.30($^6$Li) 1.65($^{10}$B) | 3.30($^6$Li) 1.65($^{10}$B) |
| Density (gm cm$^{-3}$) | 2.5 | 3.5 | ~2.8 |
| Scintillation Decay Time (ns) | 70 | 200 and 700 | 100 |

In addition, the calculated efficiencies for neutron capture in the materials of interest are shown in the Table below. For the Li-glass scintillator the efficiency is tabulated for the (n,$\alpha$) reaction in $^6$Li. For the gadolinium compound, the efficiencies were calculated for the (n,$\alpha$) reaction in $^{10}$B and include the losses due to neutron capture in natural gadolinium. The yttrium compound has also been calculated for the (n,$\alpha$) reaction in $^{10}$B. The effect of replacing gadolinium with low neutron cross section yttrium is evident at low energy.

TABLE 2

CALCULATED EFFICIENCIES* FOR NEUTRON CAPTURE

| Neutron Energy (eV) | $^6$Li-Glass (GS-20) (%) | LI$^6$GD($^{10}$BO$_3$)$_3$ (%) | Li$_6$Y($^{10}$BO$_3$)$_3$ (%) |
|---|---|---|---|
| 0.0254 | 79 | 19 | 99.8 |
| 0.10 | 54 | 38 | 96 |
| 0.15 | 47 | 57 | 92 |
| 0.20 | 42 | 68 | 89 |
| 1.00 | 22 | 63 | 63 |

*All materials are 1.0 mm thick

When the detector is to be used to measure low energy neutrons using the $^{10}$B(n,$\alpha$); $^6$Li(n,$\alpha$) in the lithium lanthanide borate scintillators (e.g., lanthanides being Gd and Y), the thickness of the scintillation crystal is selected to be in the range of 0.1 to 1.0 mm. This range of thickness is chosen to reduce the sensitivity of the detectors to the ambient gamma background.

Instead of using the $^{10}$B and $^6$Li capture reactions, the lithium gadolinium borate scintillator may utilize the capture of neutrons in gadolinium nuclei which results in the emission of several simultaneous high energy and low energy gamma rays. These may be detected within the scintillator body, if a detector thickness of a few millimeters is chosen. In this case only $^7$Li and $^{11}$B would be incorporated in the crystal to prevent competing reactions.

One of the key advantages of incorporating $^{10}$B in a scintillator arises from the possibility of discriminating against gamma backgrounds by requiring a coincidence between the energetic charged particles (alpha plus $^7$Li) and the 478 keV gamma ray produced upon neutron capture. In the $^{10}$B(n,$\alpha$)$^7$Li* reaction, the $\alpha$ and Li* are emitted in opposite directions and the Li* quickly decays via gamma emission to its ground state, Li. The gamma emission is, for all practical purposes, simultaneous with the $\alpha$ particle emission and detection.

High intrinsic light yields are important because the energy release upon capture of a low energy neutron in $^{10}$B is only 2.8 MeV, (2.3 MeV for the charged particles) as compared to 4.8 MeV in $^6$Li. Because of nonlinearities inherent in typical scintillators, the pulse height of the $^{10}$B signal is only about 20% of the $^6$Li signal. For a boron containing scintillator that is 5 times as efficient as Li-glass, the $^{10}$B capture signal would just equal the $^6$Li glass capture signal.

Because the intensity of background signals from gamma rays generally increases with decreasing pulse height, it is important to find materials with good scintillation efficiency for heavy charged particles (alphas, $^7$Li etc). A convenient measure of this characteristic is the light output per unit energy for alpha particles relative to beta particles ($\alpha/\beta$ ratio). The $\alpha/\beta$ ratio for Li$_6$Gd(BO$_3$)$_3$ was found to be 1.5 times that of Li glass, indicating a significant improvement. The ability to discriminate against gamma background was tested with a 6 cm$^3$ piece of BC454 boron loaded plastic scintillator (from Bicron Corporation) irradiated by moderated neutrons from $^{252}$Cf source. A coincidence was required between the charged particles signal in the plastic and the gamma ray signal in a surrounding NaI(Tl) scintillator.

Figure 4:
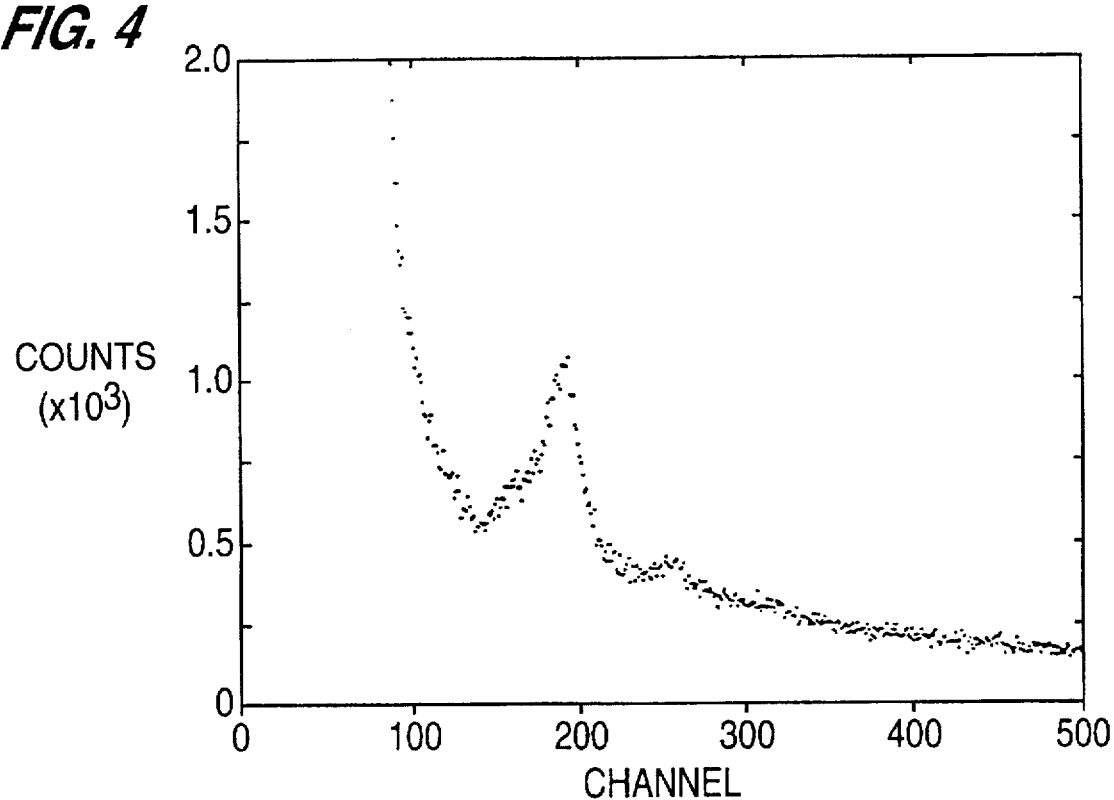
FIG. 4 shows the NaI pulse height spectrum output with no coincidence requirement wherein the isolated peak represents the full energy peak for the 478 keV gamma ray.
Figure 5:
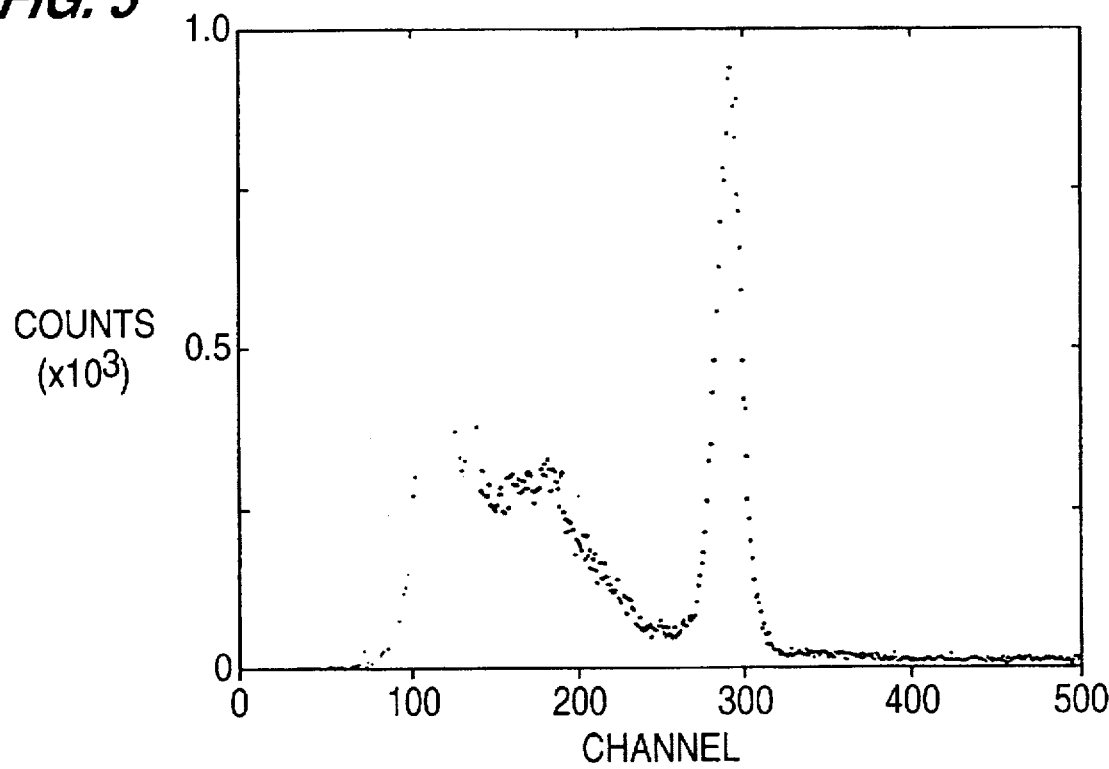
FIG. 5 shows the NaI pulse height spectrum output with coincidence required with a boron-loaded plastic scintillator.

The pulse height spectra of the NaI crystal are shown in FIGS. 4 and 5. The single isolated peak represents the full-energy peak from the 478 keV gamma ray. In FIG. 4, the raw data are presented, with no coincidence requirements. In FIG. 5, a coincidence is required between the gamma ray signal and the charged particles detected in the plastic scintillator. A large reduction in the competing gamma background can be observed.

FIG. 6 is a block diagram of a typical coincidence arrangement to take advantage of the dual emission of charged particles and gamma rays in neutron capture in $^{10}$B. The $\alpha$ particles are produced within the scintillator 10 (fabricated for example from a lithium lanthanide borate crystal) which generates light in response to detection of the $\alpha$ particle. The detected light is converted into a first electronic signal (and amplified) by means of a photomultiplier (PM) tube 12. The 0.478 MeV gamma ray is detected in a surrounding NaI(tl) crystal 14 serving as a gamma detector. The light output from the crystal 14 is converted to a second electronic signal via a PM tube 16. A coincidence is formed between the first and second electronic signals using commercially available electronic circuits.

FIG. 7 is a block diagram of a typical electronic circuit arrangement for recording the coincidence-gated signal. The first and second signals are fed into a coincidence unit 20 to confirm the presence of both signals in timed coincidence. A separate analog signal from the PM tube 12 (identified as a "third" signal in FIG. 6) or PM tube 16 (identified as a "fourth" signal in FIG. 6) is analyzed in pulse height analyzer 22 only when a true coincidence signal from the coincidence unit 20 is present at the "gate-in" input to the analyzer 22.

Applications

1) Cold (less than 10 mili-e.v.) neutron and thermal (between 10 and 100 mili-e.v.) neutron detectors may be fabricated using a $^7Li_6Y(^{10}BO_3)_3(Ce)$ crystal utilizing the $^{10}B$ neutron capture reaction. Yttrium is chosen to remove competing capture reactions.

2) $^7Li_6Y(^{10}BO_3)_3(Ce)$ is useful as in epi-thermal (greater than 100 mili-e.v.) neutron detector utilizing the ($^{10}B$) neutron capture reaction. In this energy range, Gd does not significantly degrade the detector's efficiency.

3) $^6Li_6Y(^{11}BO_3)_3(Ce)$ may be used as the detector scintillator for cold and thermal neutrons utilizing the $^6Li$ neutron capture reaction.

4) $^6Li_6Y(^{11}BO_3)_3(Ce)$ may be used as the scintillator crystal for epi-thermal neutrons utilizing the $^6Li$ neutron capture reaction.

5) $^7Li_6Gd(^{11}BO_3)_3(Ce)$ may be used as the scintillator crystal for cold and thermal neutrons utilizing the $Gd(n,\gamma)$ capture reaction.

6) $^7Li_6Y(^{11}BO_3)_3$ may be used as the scintillator in a high energy neutron flux monitor utilizing the $^{11}B$ $(n,\alpha)$ reaction.

Lithium gadolinium borate will serve as the basis for detector systems with an efficiency comparable to lithium glass system, but with greatly reduced gamma sensitivity. The first generation of these instruments will find applications using neutrons with energies greater than 0.1 eV. Lithium yttrium borate based systems could provide an efficient, low gamma background system for neutrons of energy less than 0.1 eV. These new materials offer the possibility of greatly enhancing the quality of data produced by neutron scattering facilities.

The principles of the invention are also applicable to the measurement of high energy neutrons using $^7Li_6Y^{11}B_3O_9$ (Ce). (The "Ce" stands for cerium activated). In this case the endothermic reaction $^{11}B(n,\alpha)$ is used to measure the flux of high energy (greater than 7 MeV) neutrons. This measurement relies upon the recording of the beta particles which are emitted in the decay of the $^8Li$ reaction products.

What is claimed is:

1. A low energy neutron detector comprising a $^7Li_6Gd^{10}B_3O_9(Ce)$ crystal as a scintillator utilizing the $^{10}B$ (neutron, alpha) exothermic neutron capture reaction.

2. A low energy neutron detector comprising a $^6Li_6Gd^{11}B_3O_9(Ce)$ crystal as a scintillator utilizing the $^6Li$ (neutron, alpha) exothermic neutron capture reaction.

3. A low energy neutron detector comprising a $^7Li_6Y^{10}B_3O_9(Ce)$ crystal as a scintillator utilizing the $^{10}B$ (neutron, alpha) exothermic neutron capture reaction.

4. A low energy neutron detector comprising a $^6Li_6Y^{11}B_3O_9(Ce)$ crystal as a scintillator utilizing the $^6Li$ (neutron, alpha) exothermic neutron capture reaction.

5. A high energy neutron flux monitor comprising a $^7Li_6Y^{11}B_3O_9(Ce)$ crystal as a scintillator using the $^{11}B$ (neutron, alpha) endothermic reaction.

6. Apparatus for detecting neutrons comprising:
a cerium activated scintillation crystal containing $^{10}B$, said scintillation crystal emitting light in response to $\alpha$ particles emitted from a $^{10}B(n,\alpha)Li^*$ reaction;
a gamma scintillator positioned adjacent the crystal, said gamma scintillator generating light in response to gamma rays emitted from the decay of $Li^*$;
a first light-to-electronic signal converter positioned to receive light from the crystal, said first converter generating a first electronic signal representative of $\alpha$ particles from the $^{10}B(n,\alpha)Li^*$ reaction;
a second light-to-electronic signal converter positioned to receive light from the gamma scintillator, said second converter generating a second electronic signal representative of gamma rays from the $^{10}B(n,\alpha)Li^*$ reaction;
a coincidence circuit connected to receive said first and second signals and to generate a coincidence signal when said first and second signal are in coincidence; and a data analyzer connected to receive an additional signal from at least one of said first and second converters, said data analyzer operative in response to said coincidence signal.

7. Apparatus as recited in claim 6 wherein said cerium activated scintillation crystal comprises $^7Li_6Gd^{10}B_3O_9(Ce)$.

8. Apparatus as recited in claim 6 wherein said cerium activated scintillation crystal comprises $^7Li_6Y^{10}B_3O_9(Ce)$.

9. A method of detecting low energy neutrons comprising the steps of:
exposing a $^7Li_6Gd^{10}B_3O_9(Ce)$ crystal to said neutrons to be detected;
utilizing the $^{10}B(n,\alpha)$ exothermic neutron capture reaction to cause scintillation of said crystal; and
measuring the scintillation output from said crystal.

10. A method of detecting low energy neutrons comprising the steps of:
exposing a $^6Li_6Gd^{11}B_3O_9(Ce)$ crystal to said neutrons to be detected;
utilizing the $^6Li(n,\alpha)$ exothermic neutron capture reaction to cause scintillation of said crystal; and
measuring the scintillation output from said crystal.

11. A method of detecting low energy neutrons comprising the steps of:
exposing a $^7Li_6Y^{10}B_3O_9(Ce)$ crystal to said neutrons to be detected;
utilizing the $^{10}B(n,\alpha)$ exothermic neutron capture reaction to cause scintillation of said crystal; and
measuring the scintillation output from said crystal.

12. A method of detecting low energy neutrons comprising the steps of:
exposing a $^6Li_6Y^{11}B_3O_9(Ce)$ crystal to said neutrons to be detected;
utilizing the $^6Li(n,\alpha)$ exothermic neutron capture reaction to cause scintillation of said crystal; and
measuring the scintillation output from said crystal.

13. A method of detecting high energy neutrons comprising the steps of:
exposing a $^7Li_6Y^{11}B_3O_9(Ce)$ crystal to said neutrons to be detected;
utilizing the $^{11}B(n,\alpha)$ endothermic reaction to cause scintillation of said crystal; and
measuring the scintillation output from said crystal.

14. A method for detecting neutrons comprising the steps of:
positioning a cerium activated scintillation crystal containing $^{10}B$ adjacent said neutron source, said scintillation crystal emitting light in response to $\alpha$ particles emitted from the a $^{10}B(n,\alpha)Li^*$ reaction;
positioning a gamma scintillator adjacent the crystal, said gamma scintillator generating light in response to gamma rays emitted from the decay of $Li^*$;
converting light from said crystal into a first electronic signal representative of $\alpha$ particles from the $^{10}B(n,\alpha)Li^*$ reaction;
converting light firm said gamma scintillator into a second electronic signal representative of gamma rays from the $^{10}B(n,\alpha)Li^*$ reaction;
analyzing the light output from at least one of said crystal and gamma scintillator only when said first and second signals are in timed coincidence with one another.

* * * * *

UNITED STATES PATENT AND TRADEMARK OFFICE
CERTIFICATE OF CORRECTION

PATENT NO.  : 5,734,166
DATED       : Mar. 31, 1998
INVENTOR(S) : John B. Czirr

It is certified that error appears in the above-indentified patent and that said Letters Patent is hereby corrected as shown below:

At column 1, immediately after the title, please add the following statement:

--This invention was made with Government support under Grant DE-FG03-95ER82032 awarded by the Department of Energy. The Government has certain rights in this invention.--

Signed and Sealed this

Twentieth Day of October, 1998

Attest:

BRUCE LEHMAN

*Attesting Officer*   *Commissioner of Patents and Trademarks*